March 26, 1935.  R. G. BROWN  1,995,666
BRANDING METHOD AND MEANS
Filed Sept. 1, 1933  2 Sheets-Sheet 1
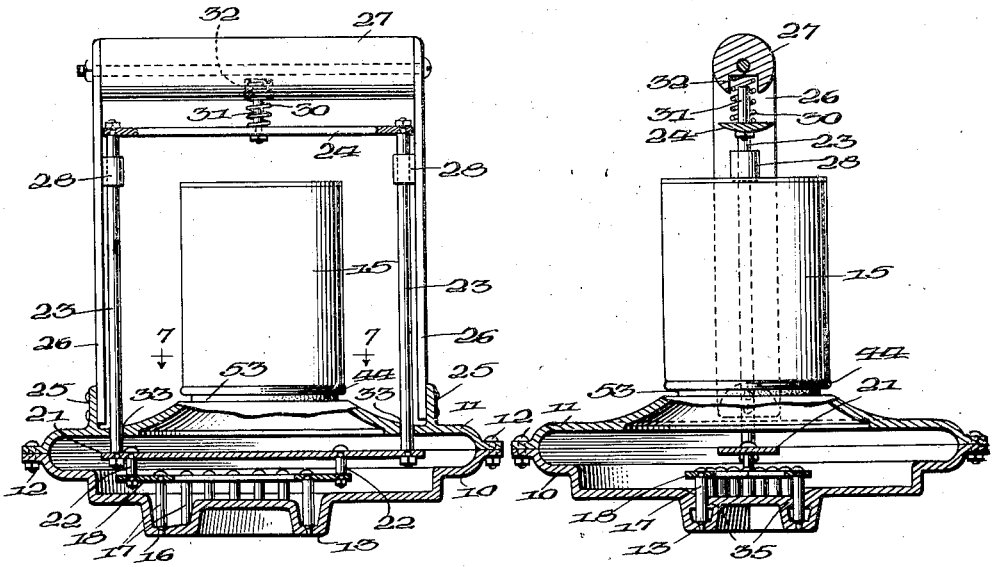
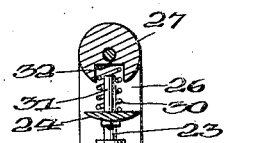
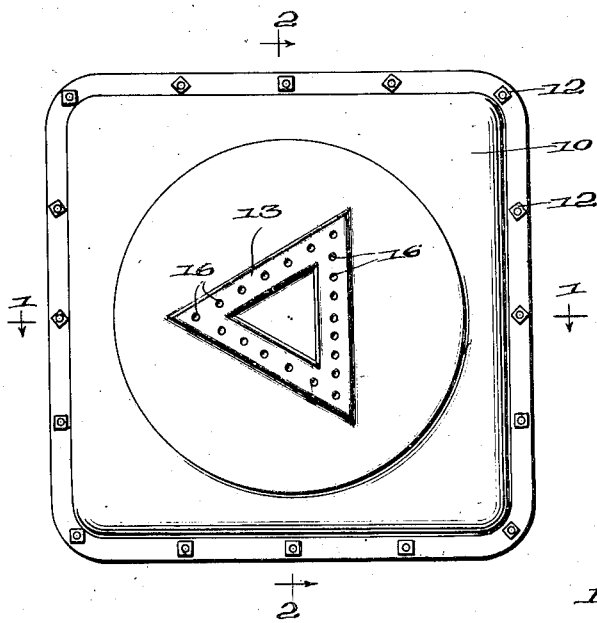
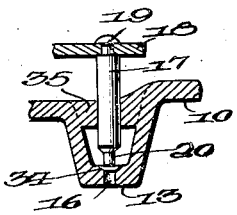
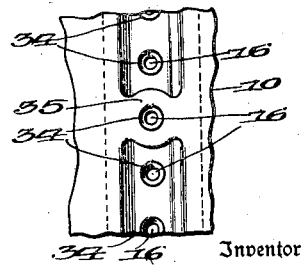
Inventor
Robert G. Brown
By Emery, Booth, Varney & Holcombe
Attorneys March 26, 1935.  R. G. BROWN  1,995,666
BRANDING METHOD AND MEANS
Filed Sept. 1, 1933  2 Sheets-Sheet 2

Inventor
Robert G. Brown,

Patented Mar. 26, 1935

1,995,666

UNITED STATES PATENT OFFICE 1,995,666

BRANDING METHOD AND MEANS

Robert G. Brown, Burleson, Tex.

Application September 1, 1933, Serial No. 687,866

12 Claims. (Cl. 101—114)

This invention relates to branding of cattle and the like and aims generally to provide an improved method and means for the purpose.

It has been customary heretofore to brand cattle either by the hot-iron method or by the use of an ordinary hot-iron type branding iron dipped into a branding fluid consisting of one or more caustic depilatories such as caustic soda, sodium sulphide, and barium sulphide, in a tar or asphaltum pitch base capable of scumming over fairly rapidly to prevent the animal from licking off the branding fluid when it commences to irritate a short while after application.

As is well known, the hot-iron method is inconvenient and frequently the struggles of the animal cause displacement of the iron and blurring of the brand, while the second method has been more or less unsatisfactory because of the tendency of the branding fluid to bridge over the recess between the brand designation of the iron or run therefrom during the application to the animal, distorting the brand and frequently obliterating it altogether. Furthermore, the dipped iron method has had the disadvantage of non-uniformly applying the branding fluid and of simply applying it on top of the mat of hair with the result that at times the brand, or a portion thereof, does not penetrate sufficiently to be permanent.

My invention aims to effect the application of a branding fluid in such manner as to avoid all of these difficulties of the former fluid branding methods and attain a more perfect brand with much greater convenience and dispatch, and to attain this end I have developed a novel method of applying the fluid, and also a novel means for carrying out the method, constituting major features of my invention; as well as subsidiary features illustrated by the preferred embodiment of branding means disclosed in detail herein which also constitute a part thereof.

In the accompanying drawings of a preferred embodiment illustrative of the device of my invention for practicing my novel method, Fig. 1 is an elevation of such embodiment, partly sectioned on the plane indicated by line 1—1 of Fig. 3, viewed in the direction indicated by the arrows;

Fig. 2 is a similar view, at right angles to Fig. 1, as indicated by the arrows on the line 2—2 of Fig. 3;

Fig. 3 is a bottom plan view of the device;

Figs. 4 and 5 are detailed sectional and plan views, respectively, on a larger scale, showing the plunger and plunger guide arrangement;

Figure 6:
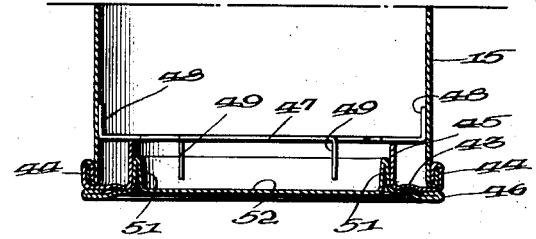
Fig. 6 is a detail sectional view of the cooperating branding fluid receptacle.

As I believe that the method of my invention will be most readily appreciated from an understanding of the means which I have devised for carrying it out, I will first describe the preferred embodiment of such means shown in the drawings.

This preferred embodiment of device illustrative of my invention comprises a branding head made up of a brand casting 10 and a head casting 11, suitably secured together, as by the rim bolts 12. The brand casting 10 of the device presents a raised head surface 13 of the desired brand configuration, which is triangular in the illustrative embodiment shown, and the head casting 11 presents a mouth 14 (Fig. 8) to receive a can or receptacle 15 of the branding fluid, which may be attached thereto, preferably in the manner shown and hereinafter described, which obviates external protuberances on the receptacles 15 that would interfere with packing and shipping of the same, and eliminates all external fastenings apt to become displaced during the rough handling to which the device is apt to be subjected.

In the operation of branding according to my invention the hard surface 13 of the desired brand configuration is adapted to be pressed tightly against the hide of the animal to be branded, after which the depilatory branding fluid is to be forced between the hard surface 13 and the hide of the animal by means such as that now to be described, to thus enforce a flow and distribution of the fluid under the area defined by the hard surface 13 which will insure its penetration to the base of the hair and against the skin of the animal, to produce a clear cut, permanent brand.

The means disclosed for effecting this forcing of branding fluid between the hard surface 13 and the hide to which it is applied, consists of a multiplicity of apertures 16, preferably uniformly distributed throughout the area of the hard surface 13, and a multiplicity of cooperating plungers 17 (see Fig. 4) fastened in a plunger plate 18, as at 19, and having reduced ends 20 adapted to be retracted to the position shown in Fig. 4 and to be advanced to the position shown in Figs. 1 and 2. In the form shown the reduced plunger tips 20, as is preferable, are of such length that in the advanced position of the plungers 17 they completely fill the apertures 16 and have their outer ends flush with the hard surface 13, completing the same as a continuous flat surface.

With this construction it will be apparent that retraction of the plungers 17 to the position shown in Fig. 4 will permit the branding fluid within the head 10—11 to flow into the apertures 16, and that subsequent advance of the plungers 17 to the position shown in Figs. 1 and 2 will trap in, and force through, the apertures 16, the small, approximately measured quantities of fluid therein, pressing the fluid out between the hard surface 13 and the hide of the animal, thus causing it to flow under the hard surface and penetrate the hair in a most satisfactory manner.

Suitable means is provided to effect the retraction and advance of the plungers 17, and in the form shown this means comprises a plunger bar 21 to which the plunger plate 18 is secured as by link pins 22, and which is in turn mounted upon operating rods 23, extending through the casting 11, and secured to an operating member 24.

In the form shown, the casting 11 is provided with a pair of ears 25, to which side bars 26 are suitably secured, which carry a transverse handle 27 at their remote ends, and these side bars 26 are provided with guides 28 through which the plunger operating rods 23 are slidable. The plunger operating member 24, as shown, may underlie the handle 27, where it may conveniently be squeezed toward the handle by the operator to retract the plungers 17; and means for advancing the plungers 17, in the form shown, is provided by a spring 30 slipped over a pin 31 carried on the operator 24, and seated in a recess 32 formed in the underside of the handle.

From this construction it will be apparent that by pulling up on the operating member 24 the operator will compress the spring until the pin 31 strikes against the end of the recess 32, which limits the throw of the parts and prevents damage thereto, thus raising the plungers to the loading position shown in Fig. 4, and that when the operator releases his grip, the spring 24 will force the plungers downwardly to their former position, forcing the branding fluid between the brand surface 13 and the hide of the animal. It is to be noted that the branding fluid used is of such character that but little, if any, leakage can occur through narrow spaces such as the apertures 33 (Fig. 1) where the operating rods 23 pierce the casing 11, and that while packing or like provision can be made to prevent leakage at these points, this is found in practice not to be essential.

Inasmuch as the plungers 17, in retracted position, are completely withdrawn from the apertures 16, it is desirable to provide means to insure proper engagement of these parts. As it is further desirable that the tips 20 of the plungers 17 be so formed as to lie flush with the face of the surface 13, both for uniformity of distribution of the branding fluid and in order that the said tips and the surface 13 may be readily cleaned by simply wiping a cloth wet with solvent over the same, this means is provided by countersinking the inner ends of the apertures 16, as indicated at 34 (see Figs. 4 and 5) to provide tapered ways to guide the plunger-tips into the apertures. To further insure alignment of the tips and apertures, the casting 10 may be provided with one or more, preferably three, guide members 35; shown in Figs. 2 and 5 as apertured web members cooperable with certain of the plungers 17 to hold the whole plunger assembly in proper position.

Figure 7:
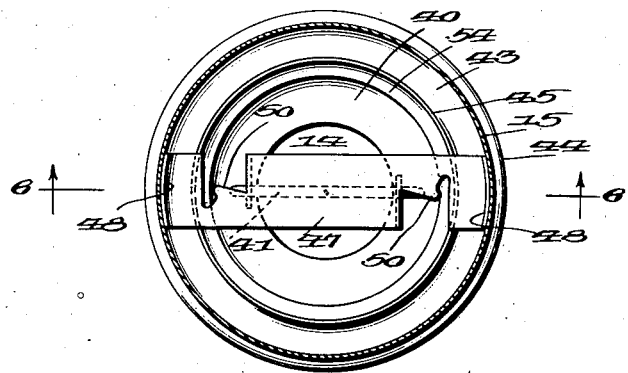
Fig. 7 is a sectional detail view taken on line 7—7 of Fig. 1 looking in the direction of the arrows, and shows the receptacle secured in place.
Figure 8:
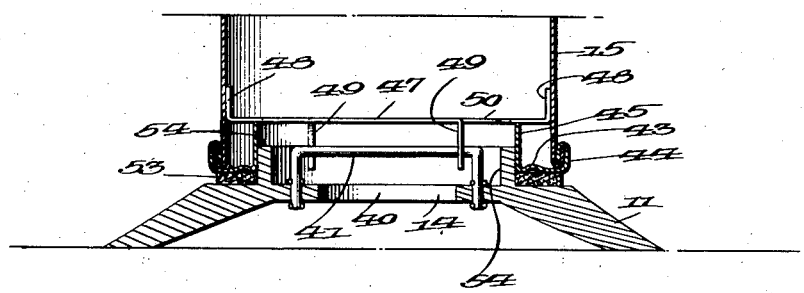
Fig. 8 is a vertical detailed sectional view taken on the line 8—8 of Fig. 7.

In the preferred embodiment, the securement of the can or receptacle 15 to the mouth 14 of the head casting 11 is effected by means which eliminates all external fastenings apt to become loosened in rough handling of the device, this means being clearly shown in Figs. 6, 7 and 8. Referring to Fig. 8, it will be perceived that the neck of the casting 11, surrounding the mouth 14, is provided with lugs or the like, shown as consolidated into an internal flange 40, to which is secured, as by the pinching method shown, a latching bar 41 adapted to extend into the mouth of the receptacle 15, to engage means internal of the body of said receptacle to retain the same in place.

In the preferred form shown, the receptacle 15 is of the press-fit cover type having a circular cover rim 43 of generally U-shaped cross-section with the outer wall 44 of the U crimped or otherwise secured to the receptacle side walls, and the inner wall 45 of the U extending back into the can to provide a seating face for its press-fit shipping-cover 46 (Fig. 6). The means internal of the body of the receptacle 15 to engage, or be engaged by, the bar 41, consists, in the form shown, of a fairly heavy sheet metal cross-bar 47, having its ends 48 turned up to engage the walls of the receptacle and spot welded, sweated or otherwise secured thereto, and having bar engaging members 49 struck out of it as shown and turned downwardly toward the mouth of the receptacle, the shape of said members 49 being clearly indicated by the outlines 50 remaining in the bar, and seen in Figure 7. As is clearly shown in Figs. 6 and 8, the bar 47 is preferably so positioned that it rests against the inner edges of the inner wall 45 of the U-shaped cover flange to be supported and stiffened thereby. This inner wall 45, as clearly shown in Fig. 6, is made deeper than the seating wall 51 of the press fit cover 46 so that the abutment thereagainst of the bar 47 in no way interferes with the seating of the cover 46, and the center 52 of the cover 46 is reentrant and lies substantially flush with the lip thereof, thus accommodating the members 49 when the cover is in place, as shown in Fig. 6.

With the construction shown it is desirable, though not absolutely necessary, to provide a washer 53, of material fairly resistant to the action of the caustic and tar of the branding fluid, to produce a tight seal between the neck of the casting 11 and the rim 43 of the receptacle, and to aid in positioning the washer and receptacle, the neck of the head casting 11 may be provided with one or more upstanding lugs, shown as consolidated into a flange 54 in the preferred form.

To prepare the device for use it is but necessary to remove the press-fit cover 46 and invert the branding head 10—11 over the receptacle, which is then secured to the mouth thereof by a slight turn engaging the hook members 49 with the bar 41, any necessary yielding being supplied by the spring of the bar 47 and compression of the washer 53. The device is then simply turned right side up and pressed against the animal, which, together with a manipulation of the operating member 24, effects a branding of the animal in accordance with my novel branding method. Even if the device be very roughly handled it will not be injured, as the rods 23 and operating member 24 are protected by the handle assembly 26—27, which also protects the receptacle 15, and as there are no external fastenings holding the receptacle to the head which might be accidentally dislodged.

Having described the preferred embodiment of means for carrying out my improved method of branding, the latter will be readily understood, and reduced to its general steps, consists in pressing against the hide of the animal to be branded a surface of a configuration corresponding to the brand mark desired, and then forcing branding fluid between the surface and hide and thus taking advantage of the pressure therebetween to cause the fluid to flow under the surface and force it to penetrate to the base of the hair and the skin of the animal over the entire area of brand configuration. The branding fluids used, such as an emulsion of a concentrated solution of caustic soda in tar or asphaltum, scum over quickly and when the brand is properly applied, insure the maintenance of the caustic in position for a sufficient period to completely remove the hair and effect a permanent brand.

It will be apparent not only that my invention effects an improved branding of the cattle, much more uniform and certain of result than heretofore; but also that my device for effecting the branding in accordance with my invention does away with the necessity for fires, dipping-pans and cumbersome irons, and may be easily transported and used on the range.

I have described a preferred embodiment of my invention for the purpose of illustrating the same but wish it to be distinctly understood that my method and apparatus are not restricted to the illustrative embodiment herein described, but include such equivalents and alternatives as will be made apparent to one skilled in the art by my disclosure, which fact is to be considered in interpreting the following claims.

I claim as my invention:

1. The method of branding which consists in pressing against the hide of the animal to be branded a hard extended surface of the area of brand configuration desired and then, while the surface is pressed against the hide area, forcing a depilatory branding fluid between the hard surface area and the hide area of the animal, thus taking advantage of the pressure between the hard surface and the hide of the animal to smoothly spread the depilatory branding fluid and flow it to and about the base of the hairs and against the skin of the animal over an area of the brand configuration desired.

2. The method of branding which consists in pressing against the hide of the animal to be branded a hard surface of the brand configuration desired and then forcing a multiplicity of small quantities of a depilatory branding fluid between the hard surface and the hide of the animal with one of said quantities at each of a multiplicity of points substantially uniformly distributed in the area of brand configuration desired, thus effecting substantially uniform intimate contact of the depilatory branding fluid with the hair and hide of the animal throughout the area of brand configuration.

3. A branding stamp comprising a hard extended surface of the area of brand configuration desired adapted to be pressed tightly against the hide of the animal to be branded, and means for forcing a depilatory branding fluid between the hard surface and the hide of the animal while the hard surface is pressed against the hide to take advantage of the pressure therebetween to distribute the depilatory branding fluid to and about the base of the hairs and against the skin of the animal over substantially the entire contacting area of said hard surface.

4. A branding stamp comprising a hard surface of the brand configuration desired adapted to be pressed tightly against the hide of the animal to be branded, and means for forcing a multiplicity of small quantities of branding fluid between the hard surface and the hide of the animal, one at each of a multiplicity of points distributed substantially uniformly throughout the hard surface, to take advantage of the pressure therebetween to distribute the branding fluid to and about the base of the hairs and against the skin of the animal over substantially the entire contacting area of said hard surface.

5. A branding stamp comprising a container of branding fluid, a branding head fed thereby, said branding head presenting a hard surface of the brand configuration desired adapted to be pressed tightly against the hide of the animal to be branded, a multiplicity of apertures extending through said hard surface, a multiplicity of plungers movable in said apertures and retractable within said head, said plungers normally lying in an advanced position within said apertures, means for retracting said plungers that depilatory branding fluid may enter the apertures below the same, and means for forcing said plungers into advanced position in said apertures to trap and force small quantities of branding fluid ahead of them and effect distribution of the same between said hard surface and the hide of the animal.

6. A branding stamp comprising a container of branding fluid, a branding head fed thereby, said branding head presenting a hard surface of the brand configuration desired adapted to be pressed tightly against the hide of the animal to be branded, a multiplicity of apertures extending through said hard surface, a multiplicity of plungers movable in said apertures and retractable within said head, means for retracting said plungers that branding fluid may enter the apertures below the same, and means for forcing said plungers into advanced position in said apertures to trap and force small quantities of branding fluid ahead of them and effect distribution of the same between said hard surface and the hide of the animal.

7. A branding stamp according to claim 5, said plungers lying flush with the face of said hard surface when in advanced position.

8. A branding stamp comprising a head including a brand casting presenting a raised hard surface of the brand configuration desired, a plurality of apertures through said raised hard surface, a plurality of plungers within said head, means for aligning said plungers with said apertures, said plungers being adapted to retract out of, and to enter and fill, said apertures, means for moving said plungers, said head having a mouth, and said stamp including a receptacle removably engageable with said mouth, said receptacle being of the press-fit cover type having a generally U-shaped cover rim, said receptacle having latching means mounted within its body internal of its U-shaped cover rim so as not to interfere with the placement of the press-fit cover, and said head comprising cooperating latching means arranged to extend through the cover opening of said receptacle and to engage with the latching means of said receptacle to secure the same against the mouth of said head.

9. In combination, a branding stamp comprising a branding head having a mouth to receive a receptacle of branding fluid, a receptacle of branding fluid having a cover rim shaped to receive a press-fit cover, latching means built into said receptacle internally of its cover rim so as not to interfere with the placement of the press-fit cover, and cooperating latching means arranged to extend through the cover opening of said receptacle and to engage with the latching means of said receptacle internally thereof to secure the same against the mouth of the branding head.

10. The combination with a branding stamp having a head provided with a mouth to receive branding fluid and a bar positioned above said mouth, of a receptacle of the press-fit cover type constructed to fit over said bar and to abut the head in surrounding relation to the mouth thereof, a second bar extending across the interior of said receptacle and secured therein, and hook members depending from said second bar and engageable with said first bar to hold the receptacle in position, said second bar and hook members lying entirely within the receptacle in position not to interfere with the application of a press-fit cover thereto.

11. For attachment to a branding stamp comprising a head presenting a mouth and having an engageable member extending upwardly through said mouth, a branding fluid cartridge of the press-fit cover type comprising an annular cover rim of generally U-shaped cross section with the inner leg of the cross section directed backwardly into the cartridge, a cross bar extending across the interior of the cartridge and supported by the internal edge of said annular inner leg, means for engaging said engageable member extending from said bar outwardly toward the mouth of said cartridge and terminating inwardly of the surface of the cover rim, said cartridge having a removable press fit cover presenting an outer lip, a seating wall bindingly fitting within said inner annular leg, and a center portion within the seating wall, said center portion lying substantially flush with said outer lip to provide for accommodation of said means, and said annular inner rim being deeper than the seating wall of the cover so that said bar supported thereagainst in no way interferes with seating of said cover.

12. Means for securing a press-fit cover type branding fluid cartridge to a branding stamp head having a mouth and a bar positioned above said mouth, said means consisting of a latching device built into the interior of the branding fluid cartridge and presenting two oppositely directed hook-like members confined within the cartridge so as not to interfere with shipping-closure of the same by a press-fit cover, said hook-like members arranged to be engaged with said bar when said cartridge is rotated against said mouth with said bar extending into the cartridge, said means thus avoiding all external fastenings and thus minimizing danger of uncoupling of the cartridge from the branding head under the rough usage to which the branding stamp may normally be subjected.

ROBERT G. BROWN.